Figure 1:
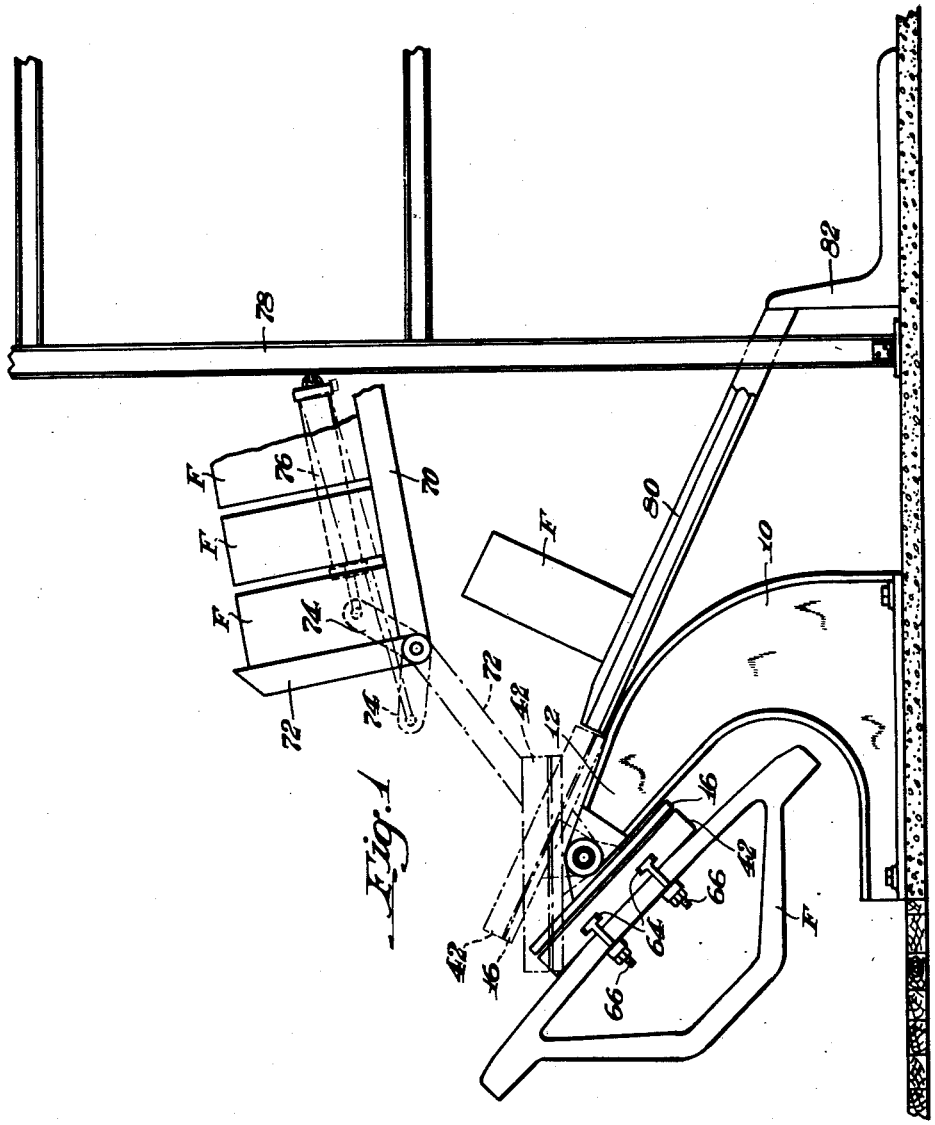

Jan. 9, 1940.  C. A. RICHARDSON  2,186,708
APPARATUS FOR SUPPORTING ARTICLES DURING WELDING
Filed July 22, 1936  3 Sheets-Sheet 1

INVENTOR.
CHARLES A. RICHARDSON
BY Brown, Critchlow & Flick
his ATTORNEYS.

Patented Jan. 9, 1940

2,186,708

UNITED STATES PATENT OFFICE 2,186,708

APPARATUS FOR SUPPORTING ARTICLES DURING WELDING

Charles A. Richardson, Pittsburgh, Pa., assignor to United Engineering & Foundry Company, Pittsburgh, Pa., a corporation of Pennsylvania Application July 22, 1936, Serial No. 91,895

6 Claims. (Cl. 29—89)

This invention relates to apparatus for supporting articles to facilitate their welding and more particularly is concerned with the provision of improved means for handling railroad car truck frames during the assembly welding thereof.

During electric or gas welding of metallic members where the welding operation is accomplished by the addition of material to the weld, it is advantageous to have the members to be welded at equal angles with the horizontal. This is particularly true in welding two members which form an angle with each other inasmuch as the weld material flows more uniformly over both members and produces not only a neater but a stronger weld. More specifically, in joining two plates at right angles to each other it has been found advisable to place each plate at an angle of 45 degrees with the horizontal and with their line of joinder horizontal, so that in welding the material added to the weld can be placed in the groove formed by the plate with the assurance that it will flow uniformly onto each plate and produce the best possible weld.

Heretofore various apparatus have been provided for supporting articles during machining, fabrication, and the like. Also it is well known to provide jigs or other mechanism to facilitate welding. However, prior to my invention, none of the apparatus with which I am familiar permits the mounting of the parts to be welded in such manner that the article can be turned to substantially any position so as to facilitate the proper welding thereof, and more particularly to bring the members or parts of the article to be welded into positions where they make equal angles with the horizontal and likewise maintain the line of joinder horizontal.

The difficulties attending the proper welding of fabricated metallic articles is particularly evident in the manufacture of railroad car truck frames, which are made up ordinarily from rolled and pressed metal sections, welded together to form a lighter but stronger structure than the old cast truck frame. The number of parts to be secured together to form the frame and the many angles of joinder provide one of the worst problems of supporting and positioning during welding that can be conceived. Unless the parts to be welded make substantially the same angle with the horizontal, as above described, the weld is apt to be lopsided, unsightly, and weak.

It is the general object of my invention to avoid and overcome the foregoing and other difficulties attending the use of known apparatus for supporting articles during welding by provision of improved mechanism adapted to quickly receive and support the article to be welded, which mechanism is easily and rapidly adjusted to place the article in any position desired to facilitate the welding of the parts thereof.

Another object of my invention is to provide apparatus for supporting and positioning railroad car truck frames during the assembly welding thereof, which is adapted to support the truck frame in any of a plurality of positions whereby all welds can be made in a horizontal line, with the faces of the members to be welded making equal angles with the horizontal.

A further object of my invention is the provision of apparatus for handling articles during welding thereof with means for supplying the articles to and receiving the articles from the apparatus.

The foregoing and other objects of my invention are attained by the combination of a table rotatably receiving a turret upon which the article to be welded is removably secured, with means for turning the turret to any angle relative to the table. The table is pivotally mounted on a base for movement through substantially 100 degrees about a horizontal axis whereby the article to be welded can be moved to substantially any position to facilitate welding thereof. Means are incorporated in the combination for controlling the relative position of the table and the base, and further means for supplying articles to the turret and for receiving the articles after welding are preferably included in the apparatus.

Figure 2:
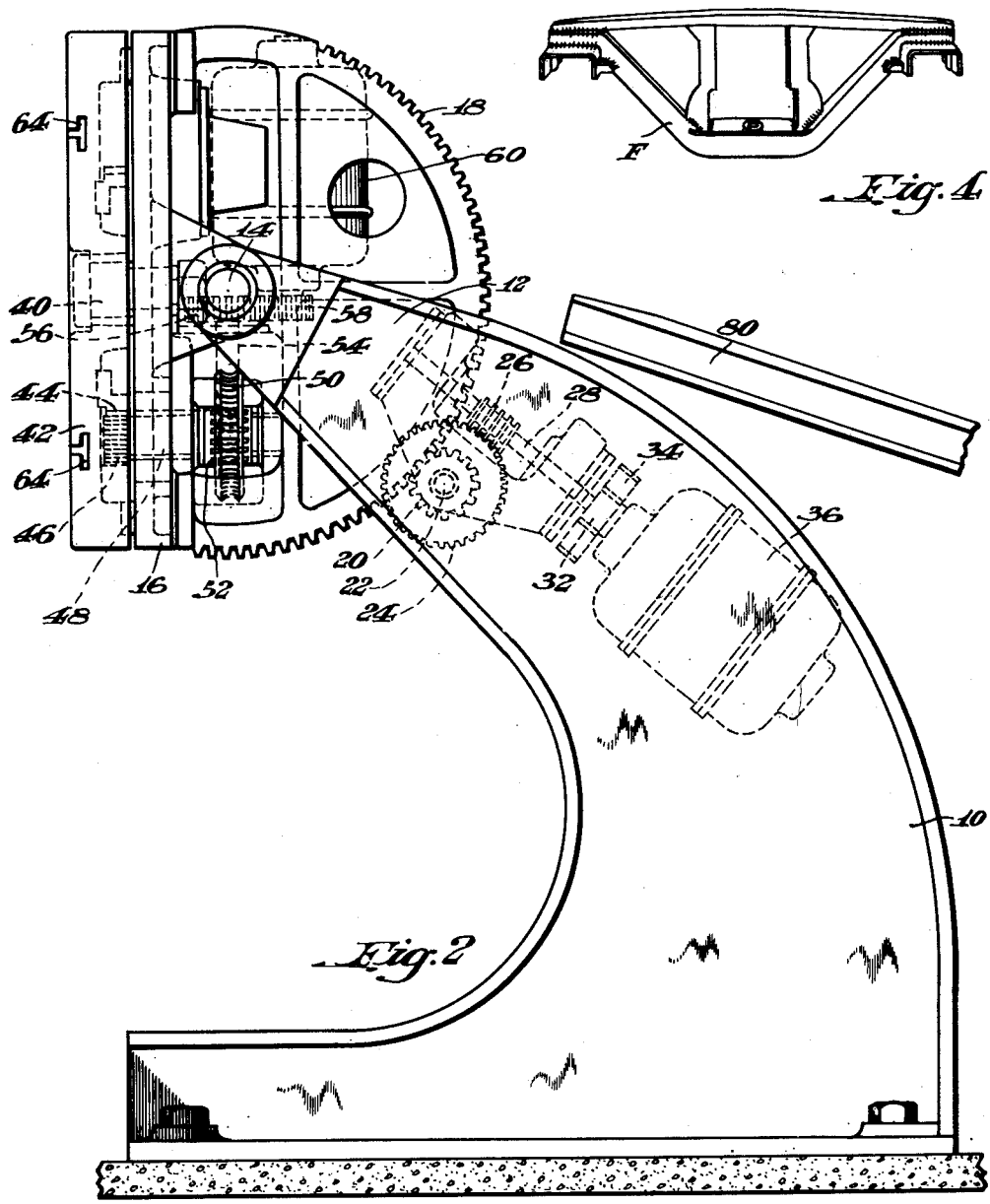
Figure 3:
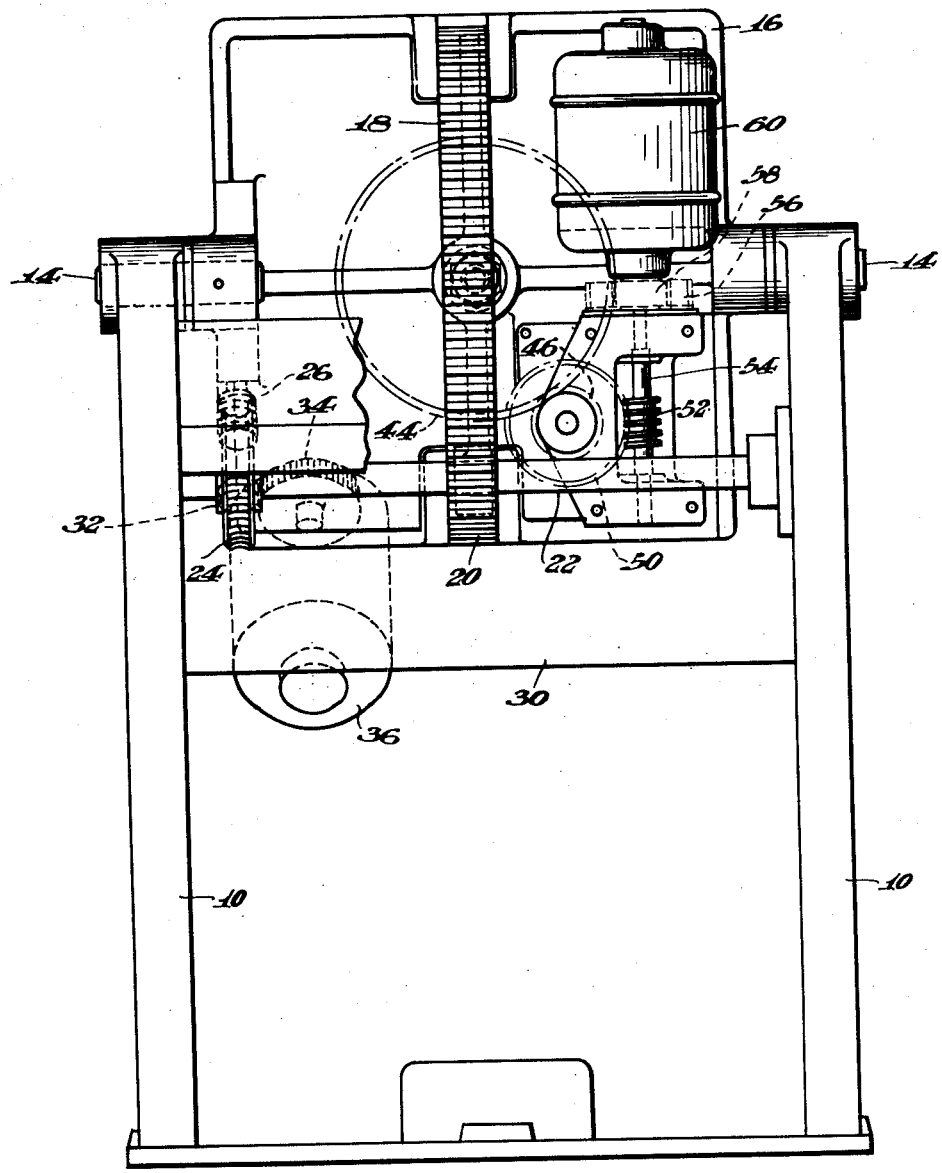

For a better understanding of the invention, reference should be had to the accompanying drawings wherein Fig. 1 is a side elevation of one embodiment of apparatus incorporating the principles of my invention; Fig. 2 is a view of the turret, table, and C-frame base of Fig. 1, but on a larger scale; Fig. 3 is an end elevation of the apparatus shown in Fig. 2; and Fig. 4 is a perspective view of a typical railroad car truck frame handled by the apparatus.

While, as above indicated, the apparatus of my invention is adapted broadly to support, position, and handle articles during welding and like operations it is particularly beneficial in the welding of railroad car truck frames which contain a multiplicity of rolled and/or pressed parts joined together at various angles and requiring line welds therebetween. Accordingly, the apparatus has been illustrated and will be described so far as the use of the apparatus is concerned as relating to the handling of railroad car truck frames.

In the drawings, the numerals 10 indicate a pair of C-shaped side frames having relatively narrow, upper arm portions 12 extending substantially in a horizontal direction. Secured at the ends of the upper arms 12 of the C-frames 10 are horizontally extending studs 14 which pivotally support a table 16 for movement about a horizontal axis. The relative position of the table 16 and C-frames 10 is preferably controlled by the provision of an arcuate rack 18 fixed to the bottom of the table 16 and extending in a vertical plane. Cooperating with the rack 18 is a pinion gear 20 fixed to a shaft 22 journaled at its ends in the C-frames 10, as best illustrated in Fig. 3. Also fixed to the shaft 22 is a worm gear 24 which engages with a worm 26 mounted upon a shaft 28 carried in suitable bearings mounted on a transverse platform 30 connecting C-frames 10 laterally together. The shaft 28 also carries a pinion 32 which engages with a gear 34 mounted upon the shaft of a reversible motor 36 supported on the platform 30. In this manner the operation of the motor 36 effects movement of the table from the full line to the dotted line positions seen in Fig. 1. The relatively narrow upper arms 12 of the C-frame 10 extending as they do in substantially a horizontal direction allow for practically 180 degrees movement of the table in a vertical plane so that it can move from substantially an upright position to substantially a completed inverted position.

Rotatably secured to the table 16 as by a stud 40 is a turret 42. The angular position of the turret 42 on the table 16 is preferably controlled by the provision of an external ring gear 44 on the turret which engages with a pinion 46 carried on a shaft 48 journaled in the table 16. The shaft 48 also carries a worm gear 50 which engages with a worm 52 secured to a shaft 54 journaled in suitable bearings fastened to the table 16. The shaft 54 carries a gear 56 which engages with a pinion 58 secured to the shaft of a reversible electric motor 60. It will be recognized that operation of the motor 60 turns the turret 42 through 360 degrees on the table 16, which together with the tilting movement of the table provides for a very complete positioning and adjustment of articles carried by the turret and adapted to be welded.

The turret 42 is formed with T-slots 64 to facilitate securing articles thereto and, as shown in Fig. 1, a railroad car truck frame F is secured to the turret by bolts 66 received in the T-slots 64 of the turret. The mechanism for controlling the relative angular position of the turret 42 on the table 16 and the relative position of the table 16 on the C-frames 10 can be used to effect the position of the frame F so that the best type of welding operation can be achieved. Specifically, the frame F can be moved to bring the portions thereof to be welded to positions where the portions make equal angles with the horizontal and the line of weld is horizontal. Moreover, the work can be readily reached for welding in substantially any position.

Preferably incorporated with the apparatus just described are means for delivering or supplying truck frame F to the turret when in an upright horizontal position and other means for receiving the truck frames from the turret after welding. In the form of the invention illustrated in Fig. 1 these means include an overhead skidway 70 supporting several truck frames F placed thereon by the usual crane and held in position by a closure gate 72 having a bell crank arm 74 pivotally connected to a fluid pressure motor 76 secured to a column 78. When the fluid motor 76 is energized, it moves closure gate 72 to a dotted position shown where it is in engagement with the edge of the turret 42. A frame F can readily be slid down the closure gate and onto the turret where it is bolted into position. Operating the fluid motor 76 in the other direction moves the gate to its full-line closing position.

For receiving the frame F after welding, the C-frames 10 are provided with inclined skidways 80 which are supported at their lower end by any suitable bracket means 82. The skidways 80 are adapted to be in substantial alignment with the turret 42 when it is swung around to the limit of its movement in one direction. Loosening of the clamping bolts 66 after welding then allows the frame F to be slid down off the turret, onto the skidways 80, and to the floor, where it can be handled by truck, overhead crane, or other means as desired.

From the foregoing it will be recognized that the objects of my invention have been achieved by the provision of improved apparatus for positioning, handling, and supporting articles, and particularly for assisting in welding railroad car truck frames. The apparatus is adapted to support the frames in any of a plurality of positions, whereby the parts thereof to be welded make substantially equal angles with the horizontal and so that the line of weld is horizontal. The apparatus is relatively inexpensive and long wearing and can be operated by an ordinary workman, without special or prolonged training. The welding operation is greatly facilitated and improved by the use of my apparatus.

While in accordance with the patent statutes, one embodiment of my invention has been illustrated and described in detail, it will be appreciated that the invention is not limited thereto or thereby but is defined in the appended claims.

I claim:

1. Apparatus for supporting a railroad car truck frame or the like during assembly welding thereof comprising a pair of C-shaped side frames, having relatively narrow upper arms, a table supported on a horizontal pivot between the side frames at the ends of the upper arms thereof, arcuate gear means secured to the underside of the table, means journaled by the side frames and operatively engaging with the arcuate gear means, reversible power means mounted by the side frames and adapted to drive the means journaled on the side frames to control the angle of the table with the horizontal, a turret, a stud pivotally securing the turret to the table for rotary movement in a plane parallel to the table, gear means secured to the turret, means journaled by the table and operatively engaging with the gear means secured to the turret, power means carried by the table and adapted to drive the means journaled on the table and engaging with the gear means secured to the turret to control the rotary position of the turret on the table, and means on the turret for securing a truck frame thereto.

2. Apparatus for supporting a frame or the like during assembly welding thereof comprising a pair of C-shaped side frames having relatively narrow upper arms, a table supported on a horizontal pivot between the side frames at the narrow ends of the upper arms thereof, an arcuate gear secured to the underside of the table and positioned in substantially a vertical plane, a gear journaled by the side frames and engaging with the arcuate gear, reversible power means mounted by the side frames and adapted to drive the gear to control the angle of the table with the horizontal, a turret, a stud pivotally securing the turret to the table for rotary movement in a plane parallel to the table, an external gear secured to the turret, a gear journaled by the table and engaging with the external gear, reversible power means carried by the table and adapted to drive the gear engaging with the external gear to control the rotary position of the turret on the table, and means on the turret for securing a frame thereto.

3. Apparatus for supporting a work piece during operations thereon comprising a pair of C-shaped side frames having relatively narrow upper arms which extend substantially horizontally, a table supported on a horizontal pivot between the side frames at the ends of the upper arms thereof, reversible power means mounted by the side frames and adapted to move the table about its horizontal pivot from an upright horizontal position to substantially an inverted horizontal position, a turret, means pivotally securing the turret to the table for rotary movement in a plane parallel to the table, power means carried by the table and adapted to control the rotary position of the turret on the table, and means on the turret for securing a work piece thereto.

4. Apparatus for supporting a frame or the like during assembly welding thereof comprising a pair of C-shaped side frames having relatively narrow upper arms, a table supported on a horizontal pivot between the side frames at the ends of the upper arms thereof, said arms and table pivot being constructed and arranged so that the table can be swung from a position substantially upright to a position almost completely inverted, reversible power means mounted by the side frames and adapted to control the angle of the table with the horizontal, a turret, means pivotally securing the turret to the table for rotary movement in a plane parallel to the table, power means carried by the table and adapted to control the rotary position of the turret on the table, and means on the turret for securing a frame thereto.

5. Apparatus for supporting a work piece during operations thereon comprising a pair of C-shaped side frames having relatively narrow upper arms, a table supported on a horizontal pivot between the side frames at the ends of the upper arms thereof, arcuate gear means secured to the underside of the table, means journaled by the side frames and operatively engaging with the arcuate gear means, means associated with the side frames for rotating the means journaled on the side frames to control the angle of the table with the horizontal, a turret, means pivotally securing the turret to the table for rotary movement in a plane parallel to the table, gear means secured to the turret, means journaled by the table and operatively engaging with the gear means secured to the turret, means associated with the table for rotating the means journaled on the table and engaging with the gear means secured to the turret to control the rotary position of the turret on the table, and means on the turret for securing a work piece thereto.

6. Apparatus for supporting heavy work pieces during shop operations thereon comprising a table, a turret rotatably mounted on the top of the table, means on said turret to fasten said work pieces thereto, means operable in any position of the table for rotating the turret with respect to said table, power means carried by the table for actuating said rotating means, side frames, pivot means mounting said table in said side frames for movement around a horizontal axis and disposed to permit the free oscillating of said table with turret and work piece around said horizontal axis and allow substantially the inverting of said table and turret between said side frames, tilting means to tilt said table around said horizontal axis into any position between the horizontal and substantially inverted positions, and power means for actuating said tilting means.

CHARLES A. RICHARDSON.